(12) United States Patent
Hoxha

(10) Patent No.: US 6,997,739 B2
(45) Date of Patent: Feb. 14, 2006

(54) DEVICE INCLUDING HOUSING ASSEMBLY WITH CONTACT MEMBERS EXTENDING THEREFROM AND METHODS OF FORMING THE SAME

(75) Inventor: Vladimir Hoxha, Ontario (CA)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/871,743

(22) Filed: Jun. 18, 2004

(65) Prior Publication Data

US 2005/0282430 A1  Dec. 22, 2005

(51) Int. Cl.
*H01R 33/945* (2006.01)
(52) U.S. Cl. ............... 439/517; 439/518; 174/65 G
(58) Field of Classification Search ........ 439/517–518, 439/741, 84, 146; 361/666–670; 174/65 G, 174/152 G; 29/844, 882
See application file for complete search history.

(56) References Cited

U.S. PATENT DOCUMENTS

| | | | | |
|---|---|---|---|---|
| 4,500,158 A | * | 2/1985 | Dola | 439/535 |
| 4,653,834 A | * | 3/1987 | Norden | 439/571 |
| 4,964,818 A | * | 10/1990 | Weatherley | 439/751 |
| 6,663,405 B1 | * | 12/2003 | Robinson et al. | 439/188 |
| 6,663,422 B1 | * | 12/2003 | Robinson et al. | 439/517 |
| 2004/0110413 A1 | * | 6/2004 | Brandstatter et al. | 439/518 |

* cited by examiner

*Primary Examiner*—Michael C. Zarroli
(74) *Attorney, Agent, or Firm*—Myers Bigel Sibley & Sajovec, P.A.

(57) ABSTRACT

A device includes a housing assembly that has a first housing member having an inner periphery defining an opening and a second housing member having an outer periphery. The second housing member is mounted within the opening such that the outer periphery and the inner periphery define a contact slot therebetween. A contact member extends through and away from the contact slot. The contact member is captured in the contact slot by the first and second housing members.

41 Claims, 6 Drawing Sheets

DEVICE INCLUDING HOUSING ASSEMBLY WITH CONTACT MEMBERS EXTENDING THEREFROM AND METHODS OF FORMING THE SAME

FIELD OF THE INVENTION

The present invention relates to housings and, more particularly, to housings having contact members.

BACKGROUND OF THE INVENTION

A variety of different applications use housings with connector members passing through a wall of the housing to connect a component within the housing to a component outside the housing. For example, an electrical circuit within the housing may be connected to an external circuit. The housing may be provided for environmental protection, physical isolation or the like. One example of use of such a housing is a photocontrol device.

Photocontrol devices may be used in a variety of applications where it is desirable to provide a control signal responsive to detection of a light level. One common application of such photocontrol devices is in the detection of ambient light levels. In particular, photocontrol devices may be used to detect the transition from daylight to night so that lights may be turned on for security, safety and/or aesthetic reasons. For example, street lights are generally provided with photocontrol devices to turn on the street lights at dusk. An example of such a photocontrol device is the Model ALR 1000, 2000, and 6000 series of photocontrols available from Tyco Electronics Corporation. Such a device may be a switch mode power converter of relatively high voltage alternating current to relatively low voltage direct current. Light may be detected by a photocontrol transistor and the electric impulses therefrom may be analyzed by various circuit components having a programmable reference level. The transistor may further operate as a switch (ON/OFF), based on a preset value corresponding to the intensity of detected light passing from day to night and vice-versa.

In such photocontrol devices, it is known to provide an electrical connector extending from a housing, typically an alternating current (AC) power connector, the configuration of which may vary based on the application/geographic location. Internally, the pins of the AC power connector are electrically coupled to a photosensor switching circuit within the housing. A variety of methods are known for attaching the AC power connector pins in the housing of the photocontrol device and coupling them electrically to the circuit within the housing. One approach uses a screw thread on a connector pin and attaching nut to secure the connector pin to the base of the housing. The secured connector pin may then be electrically connected to the internal circuit, for example, by a contact wire. Such an approach generally requires additional parts and assembly steps in assembling the photocontrol device.

In another approach, a conventional riveting method is used to attach the external connector pin to a base of the housing. In other words, an end of the connector pin extending into the housing is bent outward and flattened (flanged) to contact the wall of the housing. Internally, the rivet flange may press against a contact pad of a connector plate positioned on the wall of the housing. The connector plate, in turn, may extend into the housing and be attached to the circuit within the housing. In such an arrangement, the rivet is generally used both for the mechanical connection and to provide an electrical contact between the external connector pin and the contact pad and, as such, the electrical connection may be sensitive to the quality of the rivet.

SUMMARY OF THE INVENTION

Embodiments of the present invention provide a device including a housing assembly. The housing assembly includes a first housing member having an inner periphery defining an opening and a second housing member having an outer periphery. The second housing member is mounted within the opening such that the outer periphery and the inner periphery define a contact slot therebetween. A contact member extends through and away from the contact slot. The contact member is captured in the contact slot by the first and second housing members.

In some embodiments, the second housing member is mounted within the opening such that the outer periphery and the inner periphery define a plurality of circumferentially spaced contact slots therebetween. The device includes a plurality of contact members each extending through and being mechanically captured in a respective one of the contact slots by the first and second housing members. The contact member can include a first portion disposed in the contact slot and second and third portions extending away from the contact slot in opposed directions. The contact member can be unitary.

In some embodiments, one of the first and second housing members includes a peripheral groove and the other of the first and second housing members includes a peripheral rib. The peripheral rib and the peripheral groove are interlocked to retain the second housing member in the opening. For example, the second housing member can include the peripheral rib on the outer periphery thereof, and the peripheral rib can include a space corresponding to the slot. The housing can include a contact recess defined in at least one of the inner periphery of the first housing member and the outer periphery of the second housing member. The contact slot can be defined in part by the contact recess and the contact member can be positioned in the contact recess.

In some embodiments, one of the housing assembly and the contact member includes an anchor recess. The other of the housing assembly and the contact member includes an anchor projection extending into the contact recess to retain the contact member in the contact slot. For example, the anchor recess can be defined in the contact member, and the anchor projection can form a part of the housing assembly. The anchor recess can be a sideward opening notch defined in the contact member. In some embodiments, the housing includes a contact recess defined in the inner periphery of the first housing member and the contact slot is defined in part by the contact recess. The contact member is positioned in the contact recess.

In some embodiments, the contact member includes an anchor recess and the first housing member includes an anchor projection extending into the anchor recess to retain the contact member in the contact slot. The anchor recess can be a sideward opening notch defined in the contact member. In some embodiments, the first and second housing members are formed of a polymeric material.

In some embodiments, an electrical circuit is electrically coupled to the contact member. For example, the electrical circuit can be electrically coupled to the contact member with screws. The housing assembly can include a cover member mounted on the first housing member and defining a cavity. The electrical circuit can be mounted in the cavity. The contact member can include a connector portion extending away from the housing assembly that is adapted to engage an alternating current (AC) power connector. The device can comprise a photocontrol device and the electrical circuit can comprise a photocontrol sensor.

According to further embodiments of the present invention, methods for forming a device including contact members extending therefrom include providing a first housing member having an inner periphery defining an opening, a second housing member having an outer periphery, and a contact member. The second housing member and the contact member are positioned into the opening such that the outer periphery and the inner periphery define a contact slot therebetween. The contact member extends through and away from the contact slot. The contact member is captured in the contact slot by the first and second housing members.

DETAILED DESCRIPTION OF EMBODIMENTS OF THE INVENTION

Figure 1:
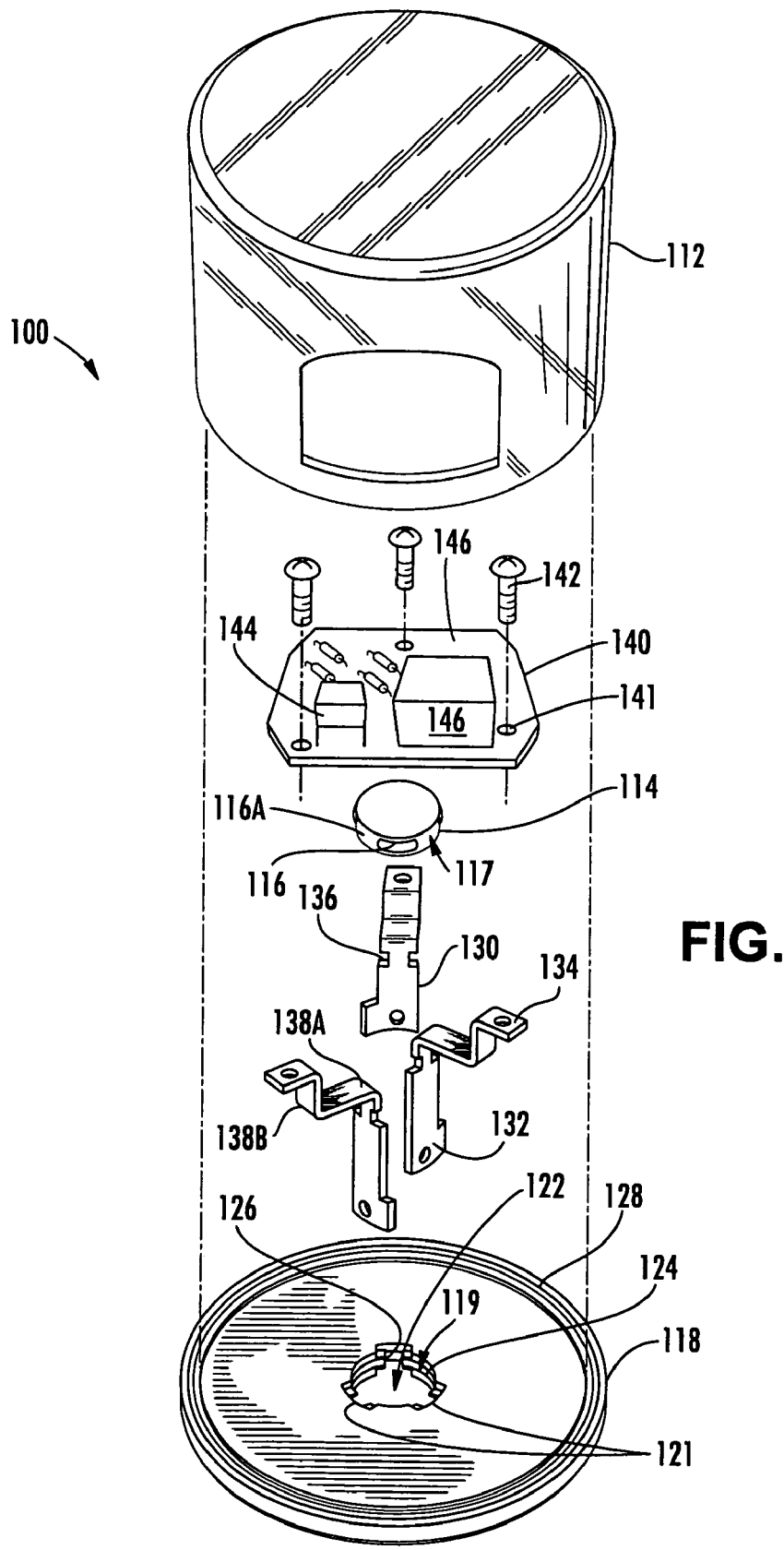
FIG. 1 is an exploded perspective view of a device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. In the drawings, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like reference numerals refer to like elements throughout. This invention may be embodied in many different forms and should not be construed as limited to the embodiments set forth herein; rather, these embodiments are provided so that this disclosure will be thorough and complete, and will fully convey the scope of the invention to those skilled in the art.

Figure 2:
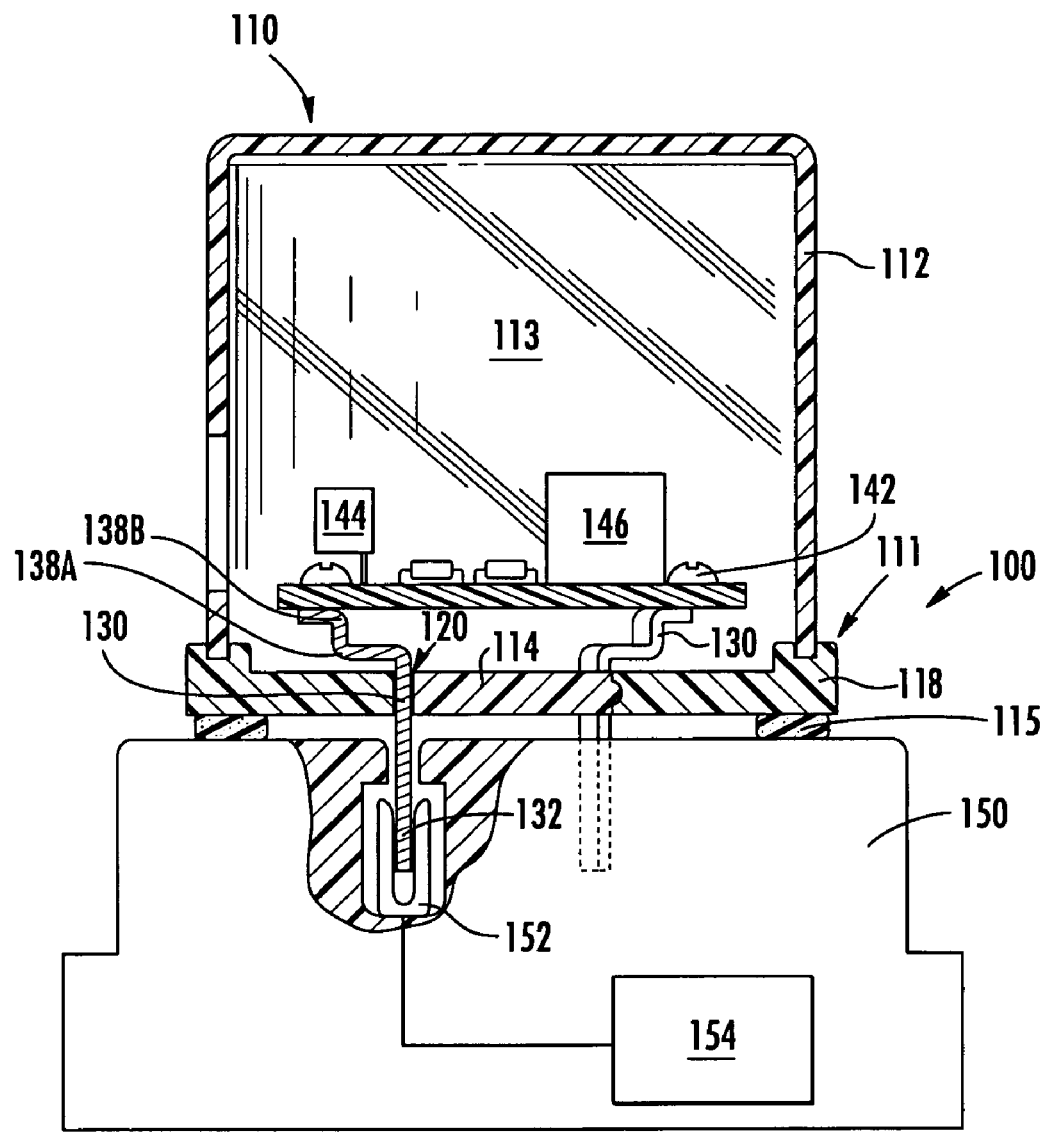
FIG. 2 is a cross-sectional side view of the device of FIG. 1 connected to an alternating current (AC) power receptacle.
Figure 3:
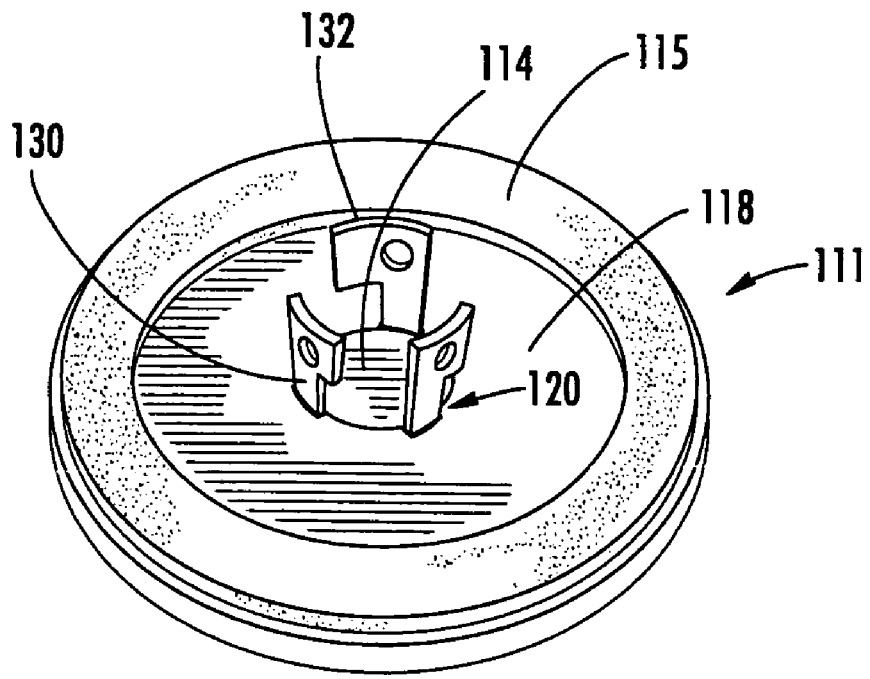
FIG. 3 is a bottom perspective view illustrating a lower portion of a base assembly of a housing assembly of the device of FIG. 1.
Figure 4:
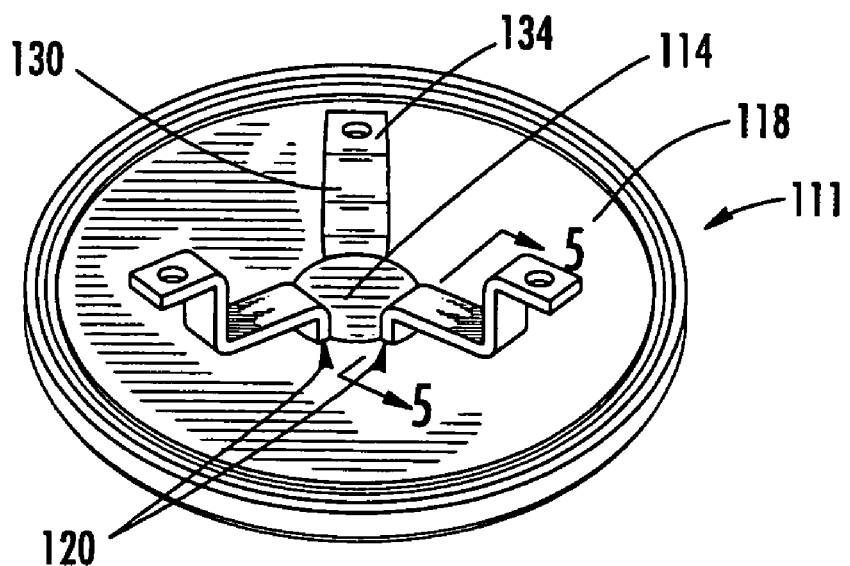
FIG. 4 is a top perspective view illustrating an upper portion of the base assembly of FIG. 3.

Embodiments of the present invention will now be described with reference to the various embodiments illustrated in FIGS. 1–10. As shown in FIGS. 1 and 2, a device 100 includes a housing assembly 110 (FIG. 2) and an electrical circuit assembly 140. The housing assembly includes a cover 112 and a base assembly 111. The base assembly 111 includes a base ring 118, a trapping disk 114, and a plurality of contact members 130 (as shown, three). The base ring 118 includes an inner periphery 119 that defines an opening 122. The contact members 130 are configured and positioned such that a portion of each of the contact members 130 fits within the opening 122. As shown in FIGS. 3 and 4, the trapping disk 114 and the contact members 130 are mounted within the opening 122 such that the contact members 130 are captured in slots 120 defined by the base ring 118 and the trapping disk 114. In the configuration shown, the slots 120 are defined, in part, by recesses 121 (FIG. 1) in the base ring 118 for holding the contact members 130 between the base ring 118 and the trapping disk 114.

As shown in FIG. 2, the cover 112, the base ring 118 and the trapping disk 114 of the housing assembly 110 define a cavity 113. The electrical circuit assembly 140 is positioned in the cavity 113. As shown in FIG. 1, the contact members 130 include upper portions 134 and lower portions 132 and anchoring notches or recesses 136 therebetween. The electrical circuit assembly 140 inside the housing assembly 110 can be secured to the upper portions 134 by screws 142 to provide mechanical and electrical connections. With reference to FIG. 2, the device 100 can be mounted on an alternating current (AC) power receptacle 150. The lower portions 132 extend away from the slots 120 (FIG. 3) and are adapted to engage an AC power connector 152, which is connected to an electrical circuit 154, such as an AC power source.

With reference to FIGS. 1 and 8–10, the base ring 118 is generally planar and the opening 122 may extend through the center of the base ring 118. The inner periphery 119 of the ring 118 defines the openings 122. Circumferentially extending grooves 124 that are adjacent a surface 119A of the periphery 119 communicate with the opening 122 and are spaced from one another by the recesses 121. The groove 124 has a width $w_g$ of between about 1.60 mm and about 1.70 mm and the groove 124 protrudes into the disk a distance $d_g$ of between about 0.20 and 0.20 mm. A pair of protrusions or teeth 126 extend laterally or circumferentially into each recess 121 from opposed sides thereof. Each of the teeth 126 has length $l_t$ of between about 1.00 and 1.10 mm and a depth $d_t$ of between about 1.40 and 1.50 mm. The base ring 118 includes an outer, circumferentially and upwardly opening groove 128. The base ring 118 may be formed of a polymeric material, such as a high temperature polyester (PBT). AS shown, the base ring 118 is generally planar and the opening 122 extends through the center; however, it will be appreciated that other configurations can be employed.

Figure 6:
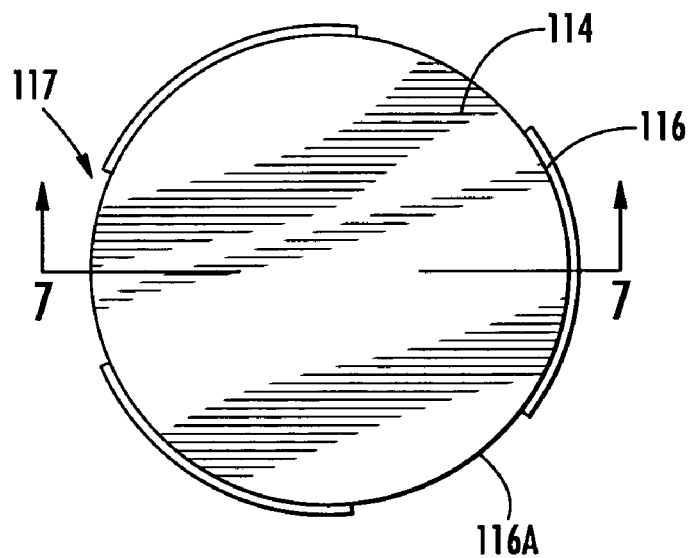
FIG. 6 is a top view of a trapping disk of the housing assembly of the device of FIG. 1.
Figure 7:
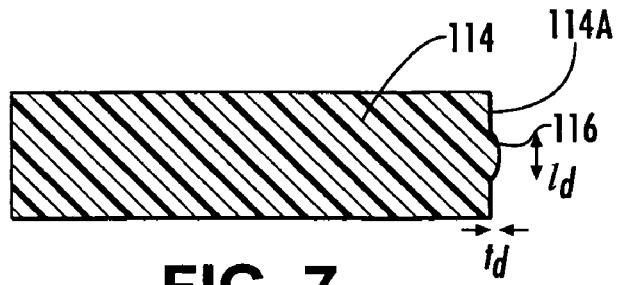
FIG. 7 is a cross-sectional view of the trapping disk of FIG. 6.
Figure 8:
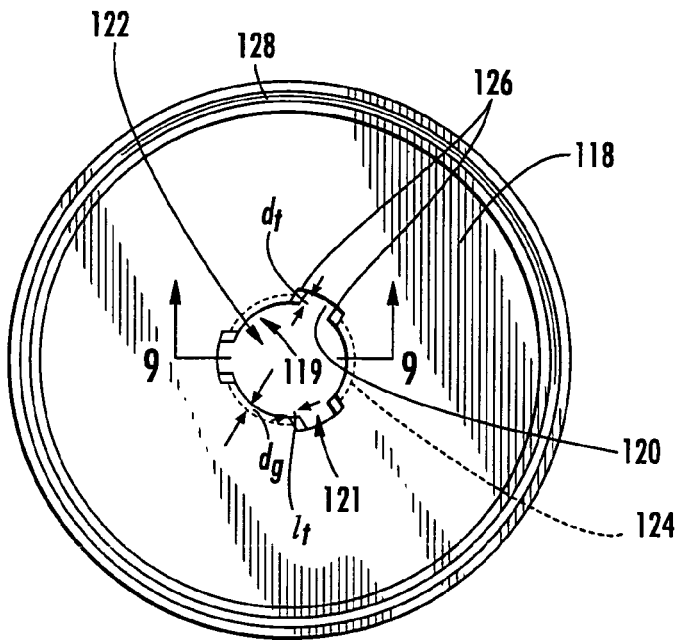
FIG. 8 is a top view of a base ring of the device of FIG. 1.
Figure 9:
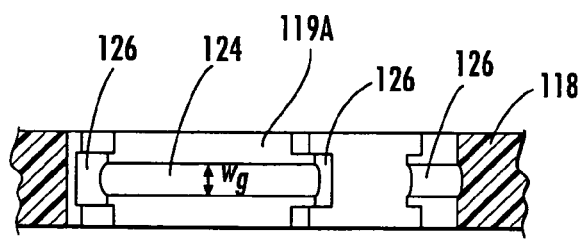
FIG. 9 is a cross-sectional view of the base ring of FIG. 8.
Figure 10:
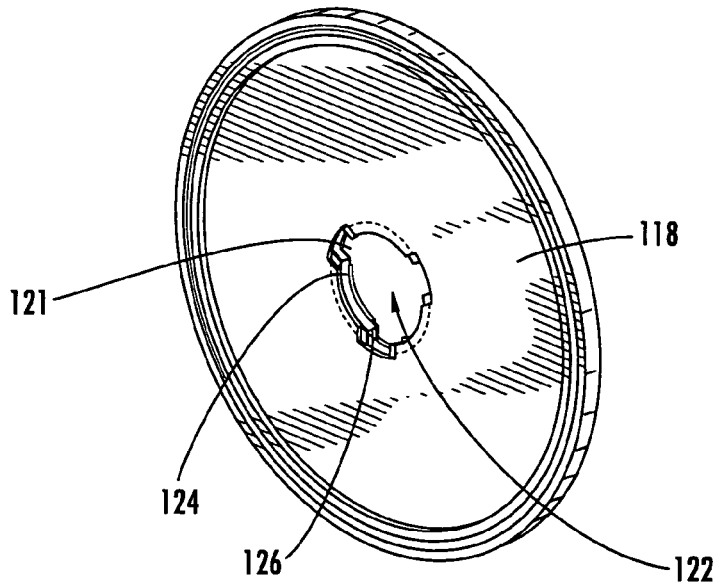
FIG. 10 is a perspective view of the base ring of FIG. 8.

As illustrated in FIGS. 6 and 7, the trapping disk 114 is generally planar and has an outer periphery 117. The trapping disk 114 includes circumferentially extending ribs 116 adjacent a surface 114A. The ribs 116 are separated by spaces, such as circumferential portions 116A, along the outer periphery 117. The ribs 116 have a radially inwardly extending thickness $t_d$ that is between about 0.20 and 0.25 mm and a length $l_d$ that is between about 1.55 and 1.65 mm. As shown in FIGS. 1 and 2, the trapping disk 114 and is positioned in the opening 122 of the base ring 118 such that the rib 116 is positioned in the groove 124 and the surfaces 114A and 119A (FIGS. 7 and 9) face one another. The clearance between the surfaces 114A and 119A can be between about 0.05 and 0.10 mm. The trapping disk 114 can exert a force against the contact members 130 that are positioned in the recessed area 121. As illustrated, the rib 116 and the groove 124 are curved. However, other shapes may be used, including a rib/groove configuration having a rectangular cross section. The radius of curvature of the rib 116 may be less than the radius of curvature of the groove 124. The trapping disk 114 may be formed of a polymeric material, such as a high temperature polyester (PBT). The trapping disk 114 can be formed of the same material as the base ring 118 or from a different material.

As illustrated in FIG. 1, the contact members 130 are elongated. The lower portions 132 of the contact members 130 are generally planar blades. As shown in FIGS. 1 and 2, the upper portions 134 extend away from the recesses 121 and radially outwardly from the opening 122 via bent portions 138A and 138B. The upper portions 134 extend inwardly into the housing assembly 110. The upper portions 134 can be connected to the electrical circuit assembly 140 by screws 142 that are positioned through openings 141 in the electrical circuit assembly 140. Each of the contact members 130 is formed of a conductive material, such as metal, and can be a unitary member that is electrically and mechanically continuous. The contact members 130 can be mechanically continuous, unitary members at the time of installation.

As illustrated in FIGS. 3 and 4, the contact members 130 are positioned within the recesses 121 of the base ring 118, and the trapping disk 114 is positioned into the opening 122 (FIG. 1) to hold and retain the contact members 130 between the trapping disk 114 and the base ring 118. When assembled, the base ring 118 and the trapping disk 114 define slots 120 therebetween. As illustrated in FIGS. 3 and 4, the slots 120 are defined, at least in part, by the recesses 121 in the base ring 118. The slots 120 generally prevent or reduce pivotal and/or horizontal movement of the contact members 130 laterally or radially with respect to the base ring 118.

Figure 5:
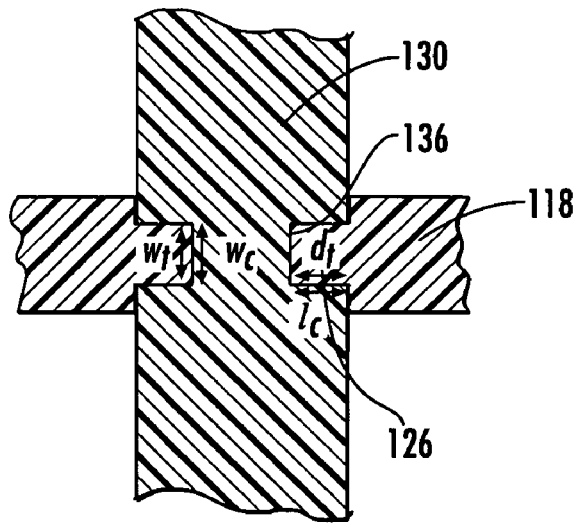
FIG. 5 is a cross-sectional view of a contact member in a slot of the housing assembly of the device of FIG. 1.

The anchoring recesses 136 of the contact members 130 are configured and positioned to interlock with anchoring projections, such as the teeth 126 in the recesses 121 of the base ring 118, to retain the contact members 130 therein. As illustrated, for example, in FIG. 5, the teeth 126 generally conform to the sideward recesses 136 of the contact members 130. In this configuration, vertical movement of the contact members 130 can be prevented or reduced. The recesses 136 extend inwardly a length $l_c$ between about 1.10 and 1.20 mm. The length $l_c$ can be greater than the depth $d_t$ of the teeth 126; for example, the distance $l_c$ can be between about 0.10 and 0.20 mm greater than the depth $d_t$ of the teeth 126. As illustrated in FIG. 5, the recesses 136 can have a width $w_c$ of between about 2.50 and 2.60 mm. The teeth can have a width $w_t$ that is less than $w_c$, for example, between 0.05 and 0.10 mm less than $w_t$.

As shown, for example, in FIG. 1, the trapping disk 114 is held in position in the opening 122 by a rib and groove configuration. The portions 116A on the trapping disk 114 correspond generally to the slots 120 in the base ring 118. Therefore, the rib 116 of the trapping disk 114 can be snap-fitted into and interlocked with the groove 124 on the base ring 118.

As illustrated in FIGS. 1 and 2, the electrical circuit 140 is electrically and mechanically connected to the upper portion 134 of the contact members 130 by screws 142. The upper portion 134 of the contact members 130 extend horizontally to hold the electrical circuit 140 in a generally horizontal orientation. The electrical circuit 140 includes a phototransistor or photosensor 144 and a switching device 146, such as an electromagnetic relay. In some embodiments, the device 100 is a photocontrol device. In such a photocontrol device, the electrical circuit 140 may be configured so that the detection of light by the photosensor 144 activates or deactivates the switching device 146 on the electrical circuit 140. The switching device 146 may, in turn, be coupled through the contact members 130 to an associated light source, such as a street lamp, that may be turned on or off responsive to the state of the switching device 146 and photosensor 144.

The lower edge of the cover 112 is positioned in the grove 128 of the base ring 118. In some embodiments, the cover 112 is snap-fitted on the base ring 118 after the contact members 130, the trapping disk 114 and the electrical circuit assembly 140 have been installed on the base ring 118. The cover 112 may be formed of a polymeric material, such as ultraviolet (UV) resistant polypropylene.

As illustrated in FIGS. 2 and 3, a gasket 115 is positioned between the device 100 and the AC power receptacle 150. The gasket 115 can seal and/or protect the contact members 130 and the AC power connectors 152.

As illustrated in FIG. 2, the device 100 provides a connection between an electrical circuit assembly 140 and an AC power receptacle 150. The contact members 130 plug into the AC power connectors 152 to connect the electrical circuit assembly 140 and the electrical circuit 154. The device can be removed from the AC power receptacle 150 and re-inserted.

Figure 11:
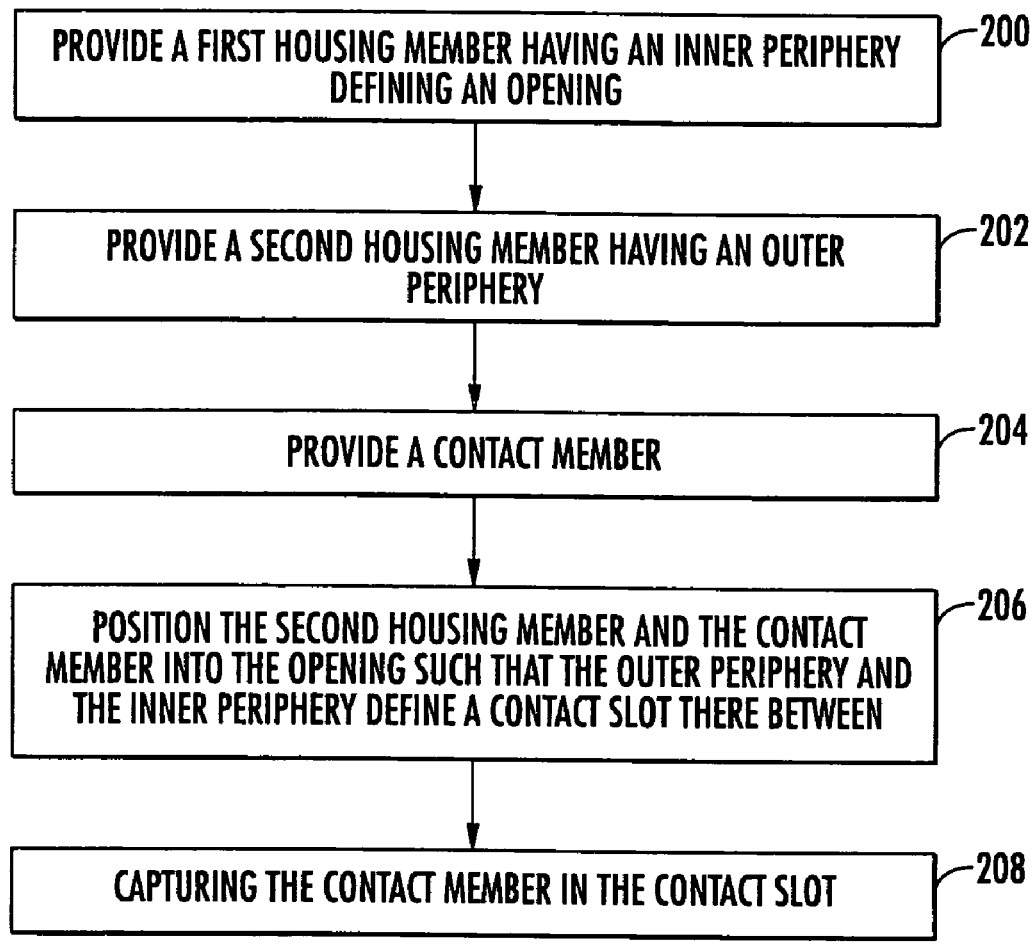
FIG. 11 is a flowchart illustrating operations according to embodiments of the present invention.

In accordance with the present invention, devices such as those described herein may be formed using methods of the present invention as follows. As illustrated in FIG. 11, a first housing member having an inner periphery that defines an opening is provided (Block 200). A second housing member that includes an outer periphery is also provided (Block 202). A contact member is provided (Block 204). The second housing member and the contact member are positioned into the opening of the first housing member such that the outer periphery and the inner periphery define a contact slot therebetween (Block 206). The contact member is captured in the contact slot (Block 208).

An example of the first housing member is the base ring 118, which includes the inner periphery 119 that defines the opening 122 as illustrated, for example, in FIG. 1 and described above. An example of the second housing member is the trapping disk 114, which includes the outer periphery 117. Examples of contact members are shown as the three contact members 130. Examples of contact slots are the slots 120 that are defined, in part, by the recesses 121 in the base ring 118. The contact members 130 and the trapping disk 114 can be positioned in the opening 122 of the base ring 118. As illustrated in FIG. 1, each of the contact members 130 forms one unitary member at the time of installation. The electrical circuit assembly 140 can be connected to the contacts 130 by the screws 142. The cover 112 can be installed by press-fitting the lower edge of the cover 112 in the groove 128, and the assembled device 100 can be inserted into the AC power receptacle 150.

Although embodiments of the present invention are described herein with reference to the configurations of FIGS. 1–10, it will be understood that other configurations can be used according to the present invention. For example, when a mating protrusion and recess are described, it will be understood that the protrusion and recess may be positioned on alternative elements.

As a specific example, although the trapping disk 114 is described as including ribs 116 that fit within the grooves 124 of the base ring 118, in some embodiments, the trapping disk 114 includes a groove and the base ring 118 includes a rib. The rib and/or groove can be omitted and the trapping disk 114 can be held in the opening 122, for example, with adhesive.

As another example, the contact members 130 are described herein has having recesses 136 that are configured to mate with the protruding teeth 126 in the base ring 118. However, it should be understood that the contact members 130 can include anchoring protrusions, and mating anchoring recesses or bores can be provided in the base ring 118. For example, the recesses 136 in the contact members 130 can be replaced with protrusions, and the teeth 126 in the base ring 118 can be replaced with recesses. Moreover, although the teeth 126 and the recesses 136 are illustrated as sideward protrusions/recesses, protrusions and/or recesses can be provided on other surfaces, such as perpendicular to the periphery of the opening 122 in the base ring 118 and perpendicular to the planar major surface of the contact members 130.

The recesses 121 are described herein as being defined in the base ring 118. However, it should be understood that the contact recesses for retaining the contact members 130 can be defined as part of the trapping disk 114. In some embodiments, the slots can be defined by recesses in both the trapping disk 114 and the base ring 118.

As illustrated in FIGS. 1 and 2, the recesses 121 and the teeth 126 can be provided in the base ring 118 for ease of manufacturing and installation and for stability. For example, the base ring 118 can be molded from a polymeric material, and these and other features may be formed as part of the molding process. Moreover, as illustrated, the base ring 118 is larger and, consequently, may be stronger and more stable than the trapping disk 114. Thus, the base ring 118 may withstand the installation of the contact members 130 into the recesses 121 and the installation of the trapping disk 114 into the opening 122. When the device 100 is inserted into the AC power receptacle 150, the load on the contacts 130 is shared primarily with the base ring 118 because the teeth 126 of the base ring 118 prevent movement of the contact members 130 in the vertical direction. In contrast, the load on the trapping disk 114 is reduced or minimal because the portions 116A of the trapping disk 114 are flush against the contact members 130. However, it should be understood that the recesses 121 and the teeth 126 can be provided in the trapping disk 114 to engage the recesses 136 of the contact members 130.

The contact members 130 are unitary members at installation and do not require assembly before or after installation, for example, to mechanically connect separate parts. This configuration can provide ease of installation by eliminating the need to connect separate parts. However, it should be understood that contact members having several discreet and separate parts can also be used.

Although embodiments of the present invention are described herein with respect to screws 142 for connecting the contact members 130 and the electrical circuit 140, other types of connections can be used, including soldered connections, snap connections and other suitable electrical connections known to those of skill in the art. In some embodiments, the contact members 130 and the openings 141 can be positioned in an irregular configuration, such as an irregular triangle, so that there is one matching orientation in which the contact members 130 may be connected through the opening 141.

As described herein, the contact members 130 are captured between the base ring 118 and the trapping disk 114. As described herein, the contact members 130 are held in position by the slots 120 and teeth 126 that conform to the recesses 136 in the contact members 130. However, it should be understood that other mechanisms can be used to retain the contact members 130 between the base ring 118 and the trapping disk 114. For example, adhesives can be used as an alternative to or in addition to the teeth 126 and recesses 136. In some embodiments, the base ring 118 and trapping disk 114 frictionally holds or assists in holding the contact members 130 therebetween. The base ring 118 and the trapping disk 114 can maintain contact or retention by the teeth 126 or other mechanical or adhesive retention feature.

Moreover, various shapes and configurations can be used. For example, the trapping disk 114, the base ring 118 and the opening 122 are illustrated as having a generally circular cross section; however, alternative shapes can be used, including ovals, rectangles and other polygons. The housing assembly 110 can be provided as one or more separate elements. For example, the base ring 118 and the cover 112 can be provided as a single, unitary member.

It will be understood by those of skill in the art that various conventional detection elements may be used to couple the photosensor 144 to the switching device 146. For example, a comparator may be provided as a detection element in a detection circuit. The comparator may be an analog comparator having a reference voltage and/or may be a digital circuit having a programmable reference level.

The illustrated contact members 130 of FIGS. 1–4 conform to an electrical receptacle configuration used in, for example, North America. However, other configurations of contact members may also be used in other embodiments of the present invention, including other configurations of power connectors.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A device comprising:
   a) a housing assembly including:
      a first housing member having an inner periphery defining an opening; and
      a second housing member having an outer periphery, wherein the second housing member is mounted within the opening such that the outer periphery and the inner periphery define a contact slot therebetween; and
   b) a contact member extending through and away from the contact slot, wherein the contact member is captured in the contact slot by the first and second housing members;
   c) wherein:
      one of the housing assembly and the contact member includes an anchor recess; and
      the other of the housing assembly and the contact member includes an anchor projection extending into the anchor recess to retain the contact member in the contact slot.

2. The device of claim 1 wherein:
the second housing member is mounted within the opening such that the outer periphery and the inner periphery define a plurality of circumferentially spaced contact slots therebetween; and
the device includes a plurality of contact members each extending through and being mechanically captured in a respective one of the contact slots by the first and second housing members.

3. The device of claim 1 wherein the contact member includes a first portion disposed in the contact slot and second and third portions extending away from the contact slot in opposed directions.

4. The device of claim 3 wherein the contact member is unitary.

5. The device of claim 1 wherein:
one of the first and second housing members includes a peripheral groove;
the other of the first and second housing members includes a peripheral rib; and
the peripheral rib and the peripheral groove are interlocked to retain the second housing member in the opening.

6. The device of claim 1 wherein:
the housing includes a contact recess defined in at least one of the inner periphery of the first housing member and the outer periphery of the second housing member; and
the contact slot is defined in part by the contact recess and the contact member is positioned in the contact recess.

7. The device of claim 1 wherein:
the anchor recess is defined in the contact member; and
the anchor projection forms a part of the housing assembly.

8. The device of claim 7 wherein the anchor recess is a sideward opening notch defined in the contact member.

9. The device of claim 1 wherein the first and second housing members are formed of a polymeric material.

10. The device of claim 1 further including an electrical circuit electrically coupled to the contact member.

11. The device of claim 10 wherein the electrical circuit is electrically coupled to the contact member with screws.

12. The device of claim 10 wherein the housing assembly further includes a cover member mounted on the first housing member and defining a cavity and the electrical circuit is mounted in the cavity.

13. The device of claim 10 wherein the contact member includes a connector portion extending away from the housing assembly, the connector portion being adapted to engage an alternating current (AC) power connector.

14. The device of claim 10 wherein the device comprises a photocontrol device and the electrical circuit comprises a photocontrol sensor.

15. A device comprising:
a) a housing assembly including:
a first housing member having an inner periphery defining an opening, and
a second housing member having an outer periphery wherein the second housing member is mounted within the opening such that the outer periphery and the inner periphery define a contact slot therebetween; and
b) a contact member extending through and away from the contact slot, wherein the contact member is captured in the contact slot by the first and second housing members;
c) wherein:
one of the first and second housing members includes a peripheral groove;
the other of the first and second housing members includes a peripheral rib;
the peripheral rib and the peripheral groove are interlocked to retain the second housing member in the opening; and
wherein the second housing member includes the peripheral rib on the outer periphery thereof, and the peripheral rib comprises a space corresponding to the slot.

16. A device comprising:
a) a housing assembly including:
a first housing member having an inner periphery defining an opening; and
a second housing member having an outer periphery wherein the second housing member is mounted within the opening such that the outer periphery and the inner periphery define a contact slot therebetween; and
b) a contact member extending through and away from the contact slot, wherein the contact member is captured in the contact slot by the first and second housing members;
c) wherein:
the housing includes a contact recess defined in the inner periphery of the first housing member; and
the contact slot is defined in part by the contact recess and the contact member is positioned in the contact recess.

17. The device of claim 16 wherein:
the contact member includes an anchor recess; and
the first housing member includes an anchor projection extending into the anchor recess to retain the contact member in the contact slot.

18. The device of claim 17 wherein the anchor recess is a sideward opening notch defined in the contact member.

19. A method for forming a device including contact members extending therefrom, the method comprising:
a) providing a first housing member having an inner periphery defining an opening and a contact recess defined in the inner periphery;
b) providing a second housing member having an outer periphery;
c) providing a contact member; and
d) positioning the second housing member and the contact member in the opening such that the outer periphery and the inner periphery define a contact slot therebetween, the contact member extends through and away from the contact slot, and the contact member is captured in the contact slot by the first and second housing members, wherein the contact slot is defined in part by the contact recess.

20. The method of claim 19 comprising:
mounting the second housing member within the opening such that the outer periphery and the inner periphery define a plurality of circumferentially spaced contact slots therebetween; and
providing a plurality of contact members and positioning the contact members such that each contact member extends through and is mechanically captured in a respective one of the contact slots by the first and second housing members.

21. The method of claim 19 further comprising positioning the contact member such that the contact member includes a first portion disposed in the contact slot and second and third portions extending away from the contact slot in opposed directions.

22. The method of claim 19 wherein the contact member is unitary.

23. The method of claim 19 wherein one of the first and second housing members comprises a peripheral groove and the other of the first and second housing members comprises a peripheral rib, the method comprising:
  interlocking the peripheral rib and the peripheral groove to retain the second housing member in the opening.

24. The method of claim 19 wherein the contact member includes an anchor recess and the first housing member includes an anchor projection, the method further comprising: engaging the anchor recess and the anchor projection such that the anchor projection extends into the anchor recess to retain the contact member in the contact slot.

25. The method of claim 24 wherein the anchor recess is a sideward opening notch defined in the contact member.

26. The method of claim 19 wherein the first and second housing members are formed of a polymeric material.

27. The method of claim 19 further comprising electrically coupling an electrical circuit to the contact member.

28. The method of claim 27 further comprising electrically coupling the electrical circuit to the contact member with screws.

29. The method of claim 27 further comprising mounting a cover member on the first housing member to define a cavity and mounting the electrical circuit in the cavity.

30. The method of claim 27 comprising positioning the contact member in the opening such that a connector portion of the contact member extends away from the housing assembly, the connector portion being adapted to engage an alternating current (AC) power connector.

31. The method of claim 27 wherein the device comprises a photocontrol device and the electrical circuit comprises a photocontrol sensor.

32. The method of claim 19 wherein positioning the second housing member and the contact member in the opening includes:
  positioning the contact member in the contact recess; and thereafter
  positioning the second housing member in the opening while the contact member is disposed in the contact recess to thereby capture the contact member in the contact recess between the first and second housing members.

33. A method for forming a device including contact members extending therefrom, the method comprising:
  a) providing a first housing member having an inner periphery defining an opening;
  b) providing a second housing member having an outer periphery;
  c) providing a contact member; and
  d) positioning the second housing member and the contact member in the opening such that the outer periphery and the inner periphery define a contact slot therebetween, the contact member extends through and away from the contact slot, and the contact member is captured in the contact slot by the first and second housing members;
  e) wherein the first housing member includes a peripheral groove and the second housing member includes a peripheral rib on the outer periphery thereof, and wherein the peripheral rib comprises a space corresponding to the slot, the method further comprising:
  positioning the second housing member such that the space aligns with the contact member; and
  interlocking the peripheral rib and the peripheral groove to retain the second housing member in the opening.

34. The method of claim 33 comprising: positioning the contact member in a contact recess, wherein the contact recess is defined in at least one of the inner periphery of the first housing member and the outer periphery of the second housing member and the contact slot is defined in part by the contact recess.

35. A method for forming a device including contact members extending therefrom the method comprising:
  a) providing a first housing member having an inner periphery defining an opening;
  b) providing a second housing member having an outer periphery;
  c) providing a contact member wherein one of the housing assembly and the contact member comprises an anchor recess and the other of the housing assembly and the contact member comprises an anchor projection;
  d) positioning the second housing member and the contact member in the opening such that the outer periphery and the inner periphery define a contact slot therebetween, the contact member extends through and away from the contact slot, and the contact member is captured in the contact slot by the first and second housing members; and
  e) engaging the contact member in the contact slot with the anchor projection and the anchor recess, wherein the anchor projection extends into the anchor recess.

36. The method of claim 35 wherein:
  the anchor recess is defined in the contact member; and
  the anchor projection forms a part of the housing assembly.

37. The method of claim 36 wherein the anchor recess is a sideward opening notch defined in the contact member.

38. A device comprising:
  a) a housing assembly including:
    a first housing member having an inner periphery defining an opening; and
    a second housing member having an outer periphery, wherein the second housing member is mounted within the opening such that the outer periphery and the inner periphery define a contact slot therebetween; and
  b) a contact member extending through and away from the contact slot, wherein the contact member is captured in the contact slot by the first and second housing members;
  c) wherein the first housing member is a generally planar base ring and/or the second housing member is a generally planar trapping disk.

39. The device of claim 38 wherein the first housing member is a generally planar base ring, the second housing member is a generally planar trapping disk, and the base ring, the trapping disk and the contact slot are disposed in a common plane.

40. The device of claim 39 wherein the base ring and the trapping disk each engage and frictionally secure the contact member therebetween in the contact slot.

41. The device of claim 39 including adhesive adhering the contact member to the base ring and/or the trapping disk.

* * * * *